May 31, 1932.  H. H. YERK ET AL  1,860,795
GRINDING MACHINE
Filed Feb. 15, 1929   5 Sheets-Sheet 3

INVENTORS
Henry H. Yerk
BY William J. Baumberger
Evans & McCoy
ATTORNEY

May 31, 1932.  H. H. YERK ET AL  1,860,795
GRINDING MACHINE
Filed Feb. 15, 1929    5 Sheets-Sheet 4

INVENTORS
Henry H. Yerk
BY William J. Baumberger

Evans & McCoy
ATTORNEYS

May 31, 1932.       H. H. YERK ET AL       1,860,795
GRINDING MACHINE
Filed Feb. 15, 1929      5 Sheets-Sheet 5

INVENTORS
Henry H. Yerk
BY William J. Baumberger
Evans & McCoy
ATTORNEY

Patented May 31, 1932

1,860,795

UNITED STATES PATENT OFFICE

HENRY H. YERK AND WILLIAM J. BAUMBERGER, OF DAVENPORT, IOWA, ASSIGNORS TO MICRO MACHINE COMPANY, OF BETTENDORF, IOWA, A CORPORATION OF IOWA

GRINDING MACHINE

Application filed February 15, 1929. Serial No. 340,271.

The present invention relates to machine tools of the type having one or more orbitally moving tool spindles and more particularly to a machine suitable for machining external cylindrical surfaces.

While the invention in its broader aspects is of quite general application, it is particularly useful for machining cylindrical surfaces intermediate the ends of an elongated piece of work such as a locomotive axle and one of the principal objects of the present invention is to provide a machine which is adapted for machining cylindrical surfaces intermediate the ends of an elongated piece of work which is immovably held during the machining operation.

A further object is to provide such a machine with a head which is adapted to encircle the work and to rotate about the same, the head carrying eccentrically mounted tool spindles and means being provided to rotate the head and simultaneously drive the spindles.

A further object is to provide means for imparting linear axial movements to the head as well as a rotating movement so that an extended portion of the work may be machined in a single operation.

A further object is to provide means for varying the reciprocating stroke of the head so that the machining operation may be confined to the desired portion of the work.

A further object is to provide means for controlling both the speed of rotation of the head and the speed of lineal travel thereof in order that the most effective action of the tool on the work may be obtained.

A further object is to provide a machine which is capable of machining the bearing surfaces of a locomotive axle upon which the wheels have been permanently mounted.

A further object is to provide a machine of the character described in which a heavy piece of work may be quickly and easily mounted in the machine for the machining operation.

With the above and other objects in view, the machine may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

In the accompanying drawings, the invention is shown applied to a machine for grinding cylindrical bearing surfaces on a locomotive car axle between the wheels attached to the ends of the axle, and, as herein illustrated, the machine is provided with a supporting frame 1 which has standards 2 adjacent opposite ends thereof which carry adjacent their upper ends axially alined longitudinally adjustable centers 3 which are adapted to engage the ends of a locomotive axle A and support the same with its axis in alinement with the axis of the centers. Each of the centers 3 is attached to the end of an internally threaded sleeve 4 slidably mounted in a horizontal bore in the standard and the sleeves 4 receive lead screws 5 which are rotatably mounted and held against longitudinal movement in the standards. Each of the screws 5 is provided at its outer end with a hand wheel 6 by means of which it may be rotated to advance or retract the sleeve 4 and center 3.

The machine of the present invention is designed to receive a locomotive axle to which the wheels have been permanently attached and to machine cylindrical surfaces on the axle between the wheels. The work is held in a fixed position during the machining operation and in order to prevent rotation of the work, a stop pin 7 is adjustably mounted in the frame for movement into and out of engagement with one of the wheels B carried by the axle, the pin 7 being provided with a rack 8 which meshes with a pinion 9, which may be rotated by means of a handwheel 10 to advance or retract the pin.

Between the end standards 2, the frame 1 is provided with a horizontal bed 11 which is positioned a considerable distance below the centers 3 and which is provided with a longitudinal way 12 in which is mounted a slide 13. Centrally thereof, the slide carries an upright bearing member 14 which has a large horizontally disposed bore which is coaxial with the centers 3 and which provides a bearing for a rotatable head 15 which is adapted to encircle an axle supported between the centers 3.

The bearing member 14 has a transverse slot 16 at the top thereof which is of a width sufficient to admit a locomotive axle or other piece of work and the rotatable head 15 is provided with a work receiving slot 17 which extends radially from its center to its periphery and which is adapted to register with the slot 16 of the bearing member.

When the slot 17 is registered with the slot 16 of the bearing member, a locomotive axle or other piece of work may be lowered by means of a crane through the slot 16 in top of the bearing member into the slot 17 of the head to a position in axial alinement with the centers so that it may be readily positioned between the centers and fixedly secured in a position of axial alinement with the head.

Figure 6:
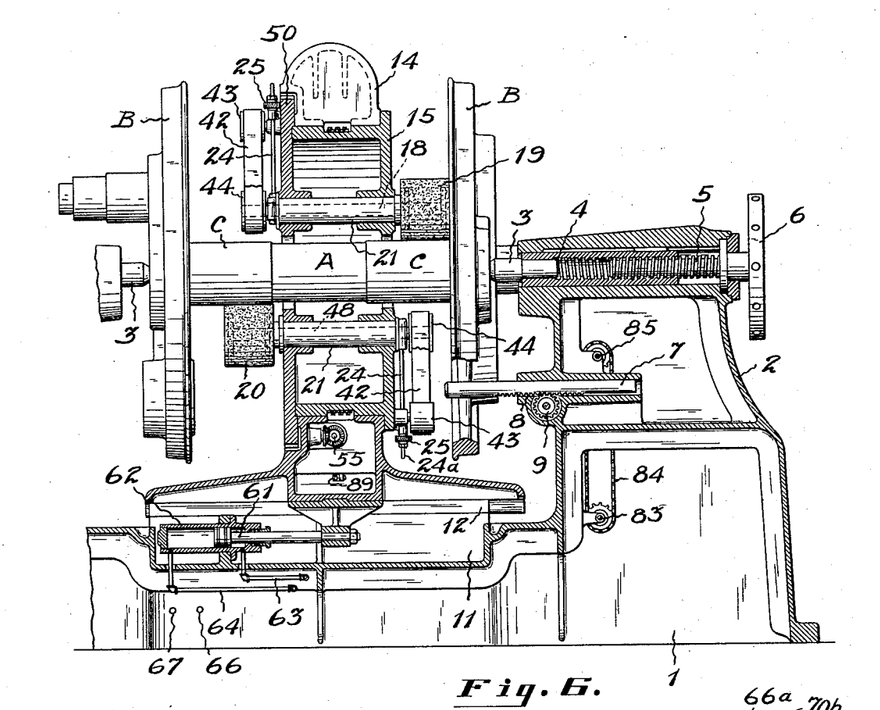
Fig. 6 is a section taken on the line indicated at 6—6 in Fig. 3.

On opposite sides of the axle receiving slot 17, the head 15 has tool spindles 18 rotatably mounted therein. These spindles are adapted to carry suitable machining tools and as shown herein, grinding wheels 19 and 20 are attached to the spindles. As shown in Fig. 6, each of the spindles has an end projecting from a side face of the head 15 and the grinding wheels are mounted on these projecting ends, one grinding wheel being mounted on one side of the head and the other on the opposite side so that cylindrical bearing surfaces "C" adjacent the inner sides of the wheels may be simultaneously ground.

Figure 4:
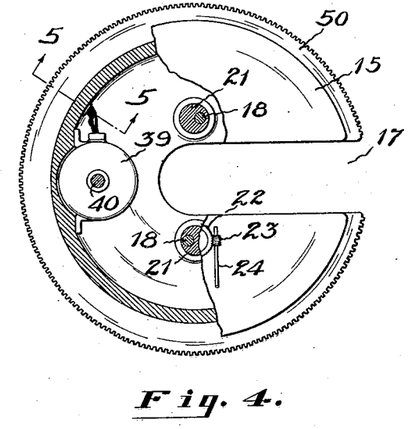
Fig. 4 is a side elevation of the rotatable spindle carrying head detached, a portion of the side wall of the head being broken away to show the interior mechanism.
Figure 5:
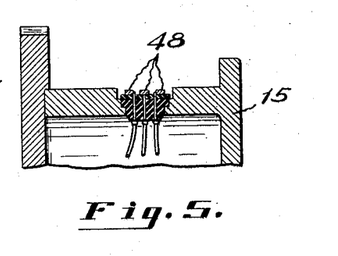
Fig. 5 is a section taken on the line indicated at 5—5 in Fig. 4.

As most clearly shown in Figs. 4 and 6, the spindles 18 are mounted eccentrically in sleeves 21 which are rotatably mounted in the head and may be adjusted radially by turning the sleeves 21 to move the grinding wheels toward or away from the axis of the head.

During the grinding operation, it is desirable that there be a very slow feed of the grinding wheels toward the surfaces being ground and means is provided for automatically turning the sleeves 21 during the operation of the machine to effect the feed of the grinding wheels.

Figure 9:
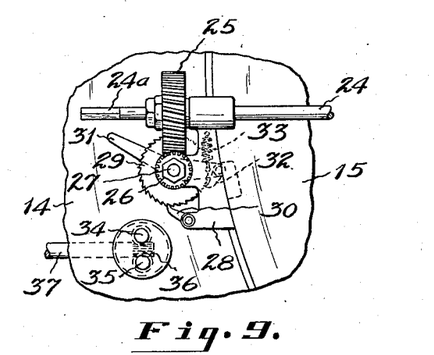
Fig. 9 is a detail view showing, in side elevation, the trip mechanism by which the tool spindles may be automatically fed forward the axis of rotation of the head during the operation of the machine.

Each of the sleeves 21 has attached thereto at one end a worm gear 22 (see Fig. 4) which meshes with a worm 23 fixed to a shaft 24 mounted in suitable bearings on a side face of the head 15. As shown in Fig. 6 of the drawings, the shafts 24 extend outwardly along the side faces of the head to the periphery thereof and adjacent the outer end each of said shafts has fixed thereto a spiral gear 25 which meshes with a spiral gear 26 fixed to a short transverse shaft 27 which is journaled in a bracket 28 fixed to the periphery of the head 15, as best shown in Fig. 9 of the drawings.

A ratchet 29 is also fixed to each shaft 27, each ratchet being engaged by a holding pawl 30 and adapted to be actuated intermittently by means of a trip lever 31 which is pivotally mounted on the shaft 27 and which carries an actuating pawl 32 through which an angular movement is imparted to the ratchet upon actuation of the lever. The end of the lever 31 which carries the actuating pawl 32 is normally held in retracted position by means of a coil spring 33 connected at one end to the bracket 28 and at the opposite end to the lever. In the normal position in which the levers 31 are held by the springs 33, the levers 31 project outwardly from the ratchet close to the side faces of the bearing member 14 and in each side of the bearing member, there are mounted two trip pins 34 and 35, either of which may be moved outwardly to a position in which it will be engaged by the outer end of a lever 31 during the rotation of the head 15. When one of the levers 31 engages one of the trip pins 34 or 35, it will be swung about its pivotal axis through an angle sufficient to permit the lever to pass the pin. This angular movement of the lever causes the actuating pawl 32 to be moved forwardly imparting a turning movement to the ratchet 29 and through the spiral gears 26 and 25, shaft 24 and worm 23 and worm gear 22 to impart a slight angular movement to the sleeve 21. The two pins 34 and 35 on each side of the bearing member are positioned at different distances from the axis of the head so that one pin imparts a greater angular movement to the lever 31 than the other, the pin closer to the axis causing the greater angular movement of the lever and a more rapid feed of the grinding wheel toward the work.

The trip pins 34 and 35 on each side of the bearing member are actuated by a pinion 36 which meshes with rack teeth on the inner end portions of the pins, the two pinions 36 being carried by shafts 37 which extend forwardly through the wall of the bearing member and which have handles 38 at their outer ends, both of which may be actuated from a neutral position, in which the pins are retracted, in either direction, to project either the pins 34 or the pins 35 into the path of the trip lever 31.

The mechanism above described, automatically imparts a very slow feed movement to the grinding wheel during the operation of the machine, as is desirable to obtain an effective grinding action. In order to obtain a quick adjustment of a grinding wheel when desired, for instance, when adjusting the grinding wheel at the beginning of the grinding operation, each shaft 24 projects beyond its gear 25 and has a squared end 24a which is adapted to receive a suitable hand crank for rotating the shaft and quickly adjusting the grinding wheel toward or away from the axis of the work to the desired position with respect thereto. The adjusting and automatic feeding mechanism for each tool spindle is independent, so that the spindles may be independently adjusted or fed to the work at different times or at different rates of speed during the operation of the machine when desired.

During the operation of the machine, the head 15 is rotated to move the grinding wheels or other machine tools carried by the spindles 18 in an orbital path around the work and means is provided for continuously driving the spindles at a relatively high rate of speed during their movement in an orbital path. In order to provide an efficient drive for the spindles 18, an electric motor 39 (see Fig. 4) is mounted upon the interior of the head 15 and has a shaft 40 which is parallel with the spindles 18 and which projects from opposite sides of the motor through the side walls of the head 15. Each end of the motor shaft 40 has fixed thereto, outside the head, a belt pulley 41 which receives a driving belt 42 which passes over the pulley 41 over an idler pulley 43 adjacent the periphery of the head and over a pulley 44 fixed to an end of one of the spindles 18. A uniform tension is maintained upon each of the belts 42 by means of a tightener pulley 45 carried by a lever 46 pivoted to the side wall of the head 15 and actuated in a direction to move the pulley 45 toward the belt, to apply tension thereto, by means of a coil spring 47 connected at one end to the outer end of the lever and at the other end to the side wall of the head 15. The pulleys 44 are attached to the ends of the spindles 18 opposite the ends to which the grinding wheels 19 and 20 are attached so that each spindle has a pulley alined with one of the pulleys on the motor shaft and adapted to receive a drive belt 42.

Figure 10:
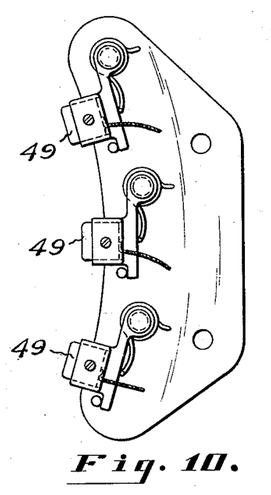
Fig. 10 is a detail view showing, in side elevation, the brushes through which current is supplied to the motor mounted within the rotatable head.

In order to supply electric current to the motor 39 during the rotation of the head, a pluraliity of conductor bands 48 are mounted on the periphery of the head and these conductor bands have suitable connections with the motor and are engaged by two sets of brushes 49 mounted on the bearing member 14. Each set of brushes is connected with line wires for supplying current thereto and the two sets of brushes, which have identical connections with the line wires, are so positioned on the bearing member that when the slot 17 is passing one set of brushes, the electrical connection is maintained through the other set of brushes.

The head 15 is continuously rotated at a uniform speeed during the grinding operation and is driven through a large spur gear 50 fixed to the head and meshing with a pair of pinions 51 carried by horizontally alined transverse shafts mounted in the lower portion of the bearing member 14. Each of the shafts 52 has a bevel gear 53 fixed thereto and the two shafts are simultaneously driven at equal speeds by means of bevel gears 54 fixed to a shaft 55 which is driven by a fluid motor 56 mounted on a bracket 57 projecting rearwardly from the bearing member 14.

The inlet and outlet of the motor 56 are connected by flexible conduits 58 with a stationary pump 59 which is driven by an electric motor 60. The outlet of the pump 59 is connected with the inlet of the motor and the outlet of the motor is connected with the inlet of the pump so that the pump circulates fluid under pressure, preferably a liquid through the motor 56 and drives the motor at a uniform speed.

In order that the grinding wheels or other machining tools may operate upon extended portions of the work, means is provided for imparting a reciprocating movement to the slide 12 which carries the head 15, the slide 12 being connected to the piston 61 of a longitudinally disposed hydraulic cylinder 62, the opposite ends of which are connected to a reversing valve 65 which is in turn connected by pipes 66 and 67 to the inlet and outlet of a pump 68 which is driven by an electric motor 69. The reversing valve 65 serves to alternately connect the pipes 63 and 64 with the pipes 66 and 67 leading to the inlet and outlet of the pump to reverse the direction of movement of the piston 61.

Figure 1:
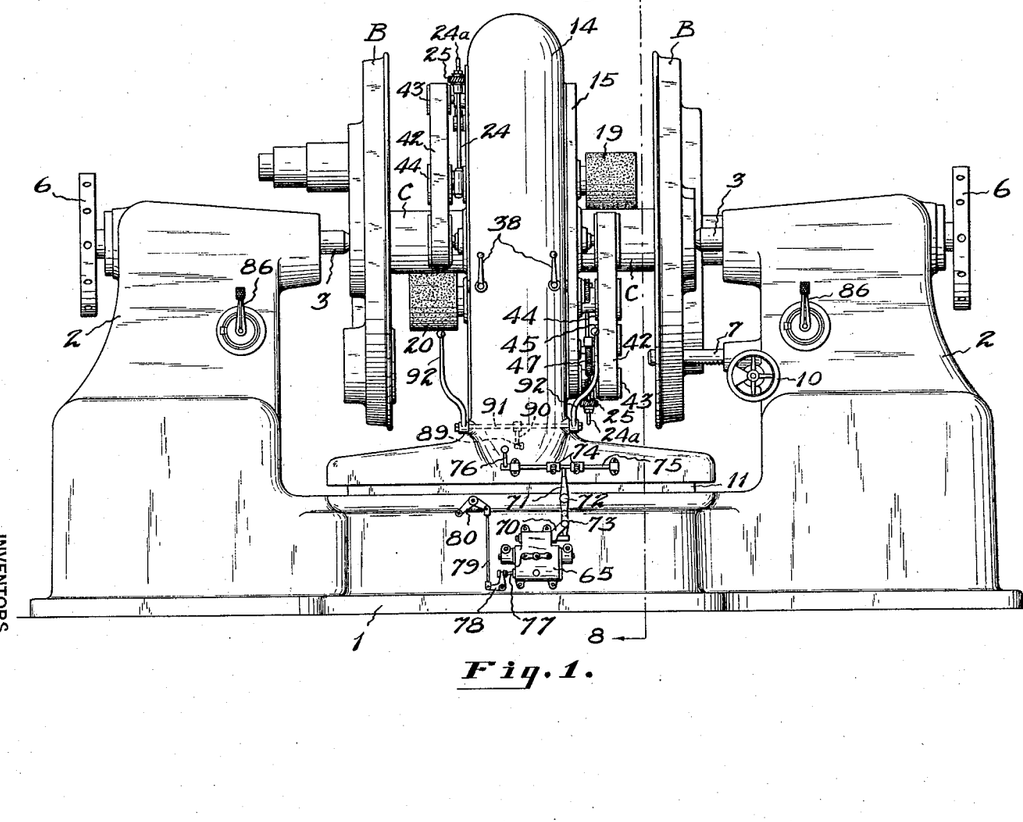
Figure 1 is a front elevation of an axial grinding machine embodying the invention.
Figure 2:
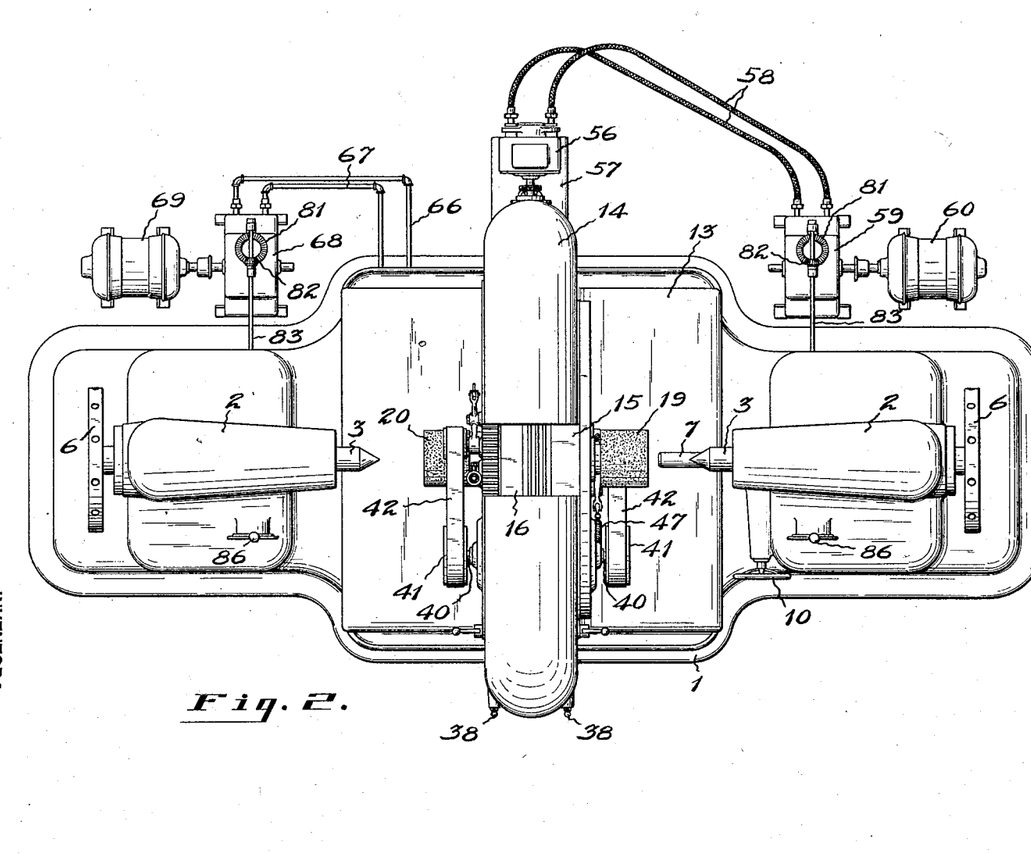
Fig. 2 is a top plan view of the machine.
Figure 3:
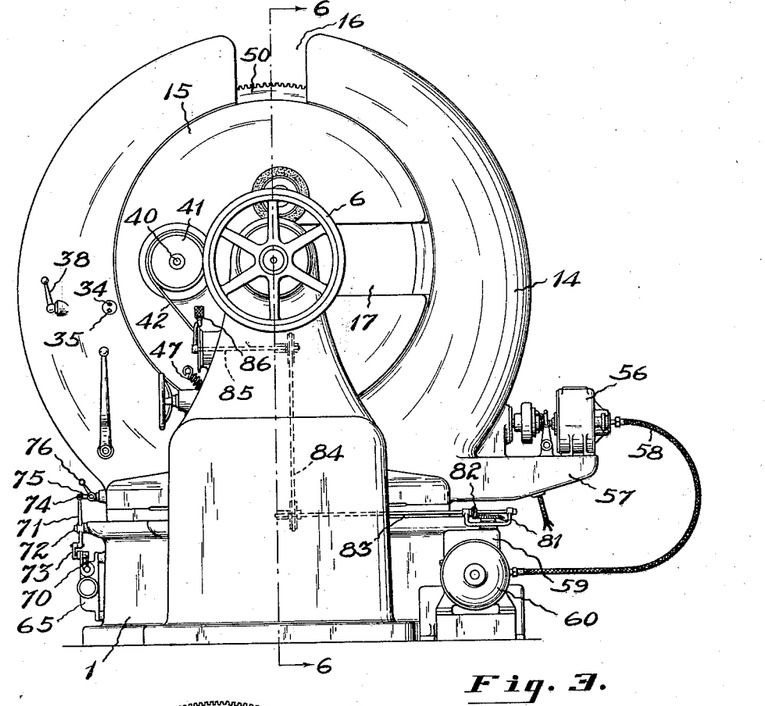
Fig. 3 is an end elevation of the machine.

The motor driven pump 68 supplies liquid through the valve 65 to the cylinder 62 at a uniform rate so that the piston 61 moves the slide 12 at a uniform linear speed in either direction and, in order to obtain continuous reciprocating movement, means is provided for automatically operating the reversing valve 65. The valve 65 has a longitudinally slidable pilot valve 70 which is connected to a trip lever 71, pivoted intermediate its ends at 72 to the front of the frame 1, as shown in Fig. 1, by means of a second lever 73 pivoted to a part of the valve casing. The upper free end of the lever 71 is adapted to be engaged by spaced stops 74 adjustably mounted on and projecting laterally from a rod 75 carried by the slide 12 at the front thereof. The pilot valve 70 is shifted in one direction by the engagement of the lever 71 with one of the stops 74 and in the opposite direction by the engagement of the lever with the other of the stops, movement of the pilot valve 70 in either direction reversing the position of the main valve member 65a to reverse the pressure connections to the cylinder 62 and reverse the direction of movement of the piston 61.

The stops 74 are independently adjustable longitudinally of the rod 75 and the distance between the two stops determines the length of the stroke imparted to the slide 12. The stops 74 may be positioned at any desired points along the length of the rod 75 so that the limits of movement of the piston 61 may be at any desired points along the length of the cylinder 62 and the limits of movement of the slide 12 may be shifted as desired so that the desired portions of the work will be engaged by the grinding wheels or other machining tools carried by the head. For instance, the stop 74 may be adjusted so that the grinding wheels operate upon the portions of the axle immediately adjacent the wheels B or so that the wheels act upon portions of the axial surface which are spaced inwardly from the wheels. If desired, the lugs 74 could be adjusted so that one grinding wheel operates upon a surface farther from the longitudinal center of the work than the surface acted upon by the other grinding wheel. In order to enable the operator to discontinue the automatic reciprocating movement of the slide, the rod 75 is rotatably mounted and provided with a handle 76 so that the lugs 74 may be swung to a position clear of the lever 71, and, in order to enable the operator to stop the movement of the slide at any time during its stroke, a separate manually operable valve 77 is provided. The valve 77 is connected at its outer end to a bell crank lever 78 which is connected by a rod 79 to a hand lever 80 mounted on the side of the frame. By actuating the hand lever 80, the operator can shift the valve 77 to a position such that the pipes leading from the valve 65 to the cylinder 62 are cut off from the pipes leading from the valve 65 to the pump, and the pipes 63 and 64 are connected through the valve so that the pressure is balanced in the cylinder 62 so that the slide may be moved manually in either direction.

Figures 7, 7A:
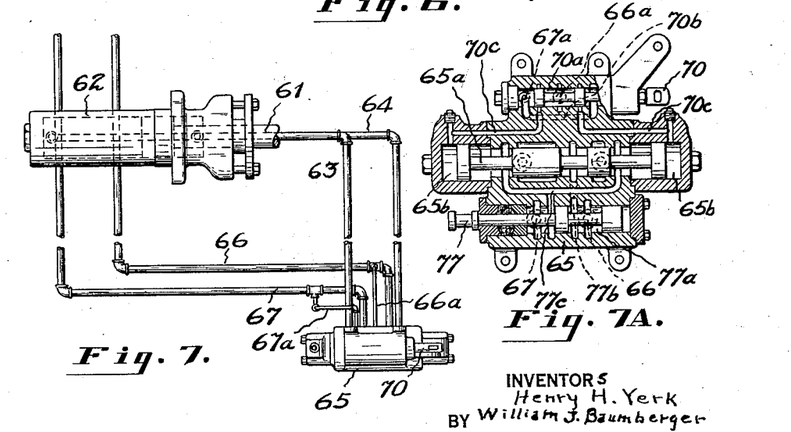
Fig. 7 is a diagrammatic detail view showing the pressure connections through which pressure is delivered to the hydraulic cylinder which imparts reciprocatng movements to the slide upon which the rotating head is mounted.
Fig. 7A is a longitudinal section taken through the fluid pressure controlling valve device.
Figure 8:
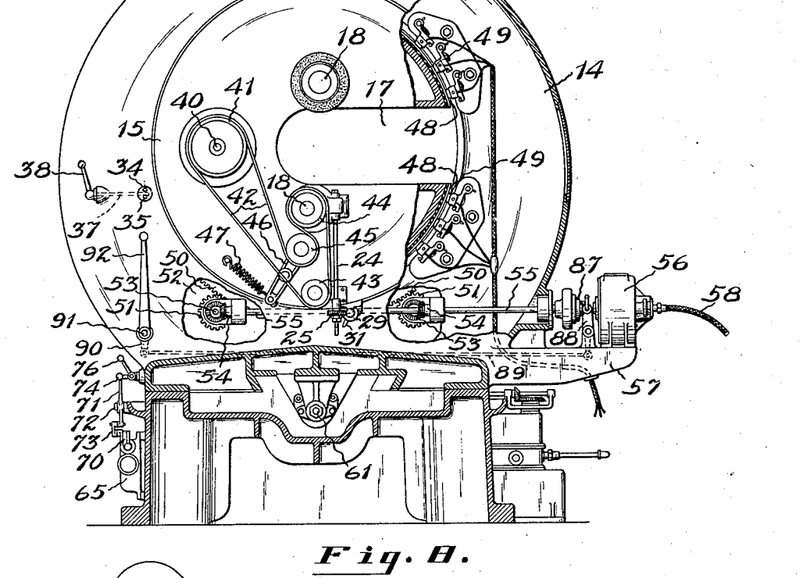
Fig. 8 is a section taken on the line indicated at 8—8 in Fig. 1.

As shown in Fig. 7A of the drawings, the reversing valve 65 has a main valve member 65a which is adapted to be moved back and forth in a valve chamber 65b by fluid pressure supplied to opposite ends of the valve chamber. The pilot valve 70 operates to supply pressure to and exhaust pressure from the chambers 65b alternately to shift the valve member 65a back and forth to reverse the pressure in the cylinder 62. The pipes 63 and 64 open into the main valve chamber 65b intermediate the ends thereof and the pipes 66 and 67 deliver into the chamber 77a of the valve 77. When the valve 77 is in its normal position, the pipe 66 communicates through a central passage 77b with the central portion of the main valve chamber and the pipe 67 communicates through passages 77c with end portions of the main valve chamber. When the main valve member 65a is shifted to the right from the position shown in Fig. 7A, the pipe 64 is placed in communication with the pipe 66 through the valve chambers 77a and 65b and the passage 77b and the pipe 64 is placed in communication with the pipe 63 through the valve chambers and passage 77c. When the main valve member is shifted to the left, pipe 66 communicates with the pipe 63 through the central passage 77b and the pipe 67 communicates with the pipe 64 through the passage 77c reversing the pressure in the cylinder 62.

The movement of the main valve member 65a is controlled by the pilot valve 70 which operates in a chamber 70a with which a branch pipe 66a connected to the pipe 66 communicates adjacent the center and with which a branch pipe 67a connected to the pipe 67 communicates adjacent one end. The opposite ends of the chamber 70a are connected by a passage 70b and passages 70c connect the chamber 70a inwardly of the ends thereof with the opposite ends of the main valve chamber 65b. The valve 70 is shifted back and forth by the trip mechanism, in one position connecting the pipe 66a alternately with opposite ends of the chamber 65b through one of the passages 70c and the pipe 67a with the opposite end of the chamber through the other passage 70c, causing a reversal of the direction of movement of the piston 61 upon each actuation of the pilot valve 70.

If the valve 77 be shifted manually to the left from the position shown in Fig. 7A, the passages 77b and 77c will be placed in communication with each other through the chamber 77a so the pipes 63 and 64 will be in communication with each other through the valve and the pressure on opposite sides of the piston 61 will be neutralized so that the slide may be moved manually, if desired.

In order to obtain the most effective action of a grinding wheel or other machining tool upon the surface of the work, it is quite essential that the tool have the proper rate of travel circumferentially of the work and also the proper rate of travel longitudinally of the work. There may be considerable variation in the speed suitable for different machining operations or for different tools and, in order to enable the operator to set the machine to the exact speeds of orbital and linear movement most suitable for a given job, means is provided for controlling both the speed of rotation of the head 15 and the speed of linear movement thereof, the controlling means for both movements being capable of fine adjustments so both the speed of rotation and the speed of linear movement may be increased or decreased in relatively small increments throughout a considerable range of speeds. The control of the speed of rotation of the head and of the speed of linear movement thereof is effected by controlling the rate at which liquid is discharged from the pumps 59 and 68. The pump 59 is controlled to vary the speed of operation of the motor 56 which drives the head 15 and the pump 68 is controlled to vary the speed of movement imparted to the slide actuating piston 61. The pump control mechanism, per se, is not a part of the present invention, being embodied in pumps which may be purchased upon the open market.

This controlling mechanism, which is the same on both pumps, is actuated by a rotatable controlling member which, for convenience of operation, is in this instance connected to a bevel gear 81 at the top of the pump which may be actuated by a bevel gear 82 meshing therewith and fixed to a shaft 83 which extends forwardly through the frame 1 of the machine to the front thereof and having a handle 86 at its front end which may be actuated to turn the shaft and adjust the controlling mechanism of the pump.

By turning the handles 86, either of the pumps 59 or 68 may be regulated to vary the rate of discharge of liquid to the motor 56 or to the cylinder 62 so that the rate of rotation of the head 15 and the rate of linear movement of the head may be accurately adjusted.

It may be desirable during the operation of the machine to quickly stop the rotation of the head 15, and, to enable the operator to stop the rotation of the head when desired, a clutch 87 is interposed between the shaft 55 and the motor 56 which may be operated by a shifter lever 88 connected by an actuating rod 89 to an arm 90 attached to a transverse shaft 91 which extends through the forward portion of the bearing member 14 and which has an actuating arm 92 attached to each end thereof on opposite sides of the bearing member 14 so that the operator by actuating either arm 92 may instantly disconnect the head 15 from its driving motor.

In the operation of the machine, the work is lowered through the slot 16 of the bearing member and through the slot 17 of the rotatable head and is clamped in a position coaxial with the head between the centers 3. The tool spindles 18 are then adjusted by turning the shafts 24 with a suitable hand crank to positions in which the grinding wheels or other tools are properly positioned with respect to the surface of the work.

In order to accurately adjust the longitudinal travel of the head, the motor 69 may be started to operate the pump 68 and the slide 12 may be moved back and forth under the control of the hand lever 80 to determine the limits of movement of the slide and to enable the operator to properly adjust the trip lugs 74 or the rod 75.

The motor 39 may then be started to drive the spindles and the motor 60 to operate the pump 59 and motor 56 to revolve the head 15, the correct speeds of rotation and linear speed of the head being obtained by adjusting the handles 86 connected to the controllers of the pump 59 and 68. During the operation of the machine, the individual spindles may be fed toward the work as desired by the trip actuated feed mechanisms controlled by the handles 38 at the front of the bearing member.

It will be apparent that the present invention provides a machine of simple and rugged construction which is adapted to accurately generate external cylindrical surfaces on work pieces which by reason of their large size or peculiar shape cannot be conveniently rotated, that the machine of the present invention provides means by which heavy work pieces may be quickly and easily mounted within a rotary head, and that simple and efficient means are provided for driving and controlling the rotating tool spindles carried by the head and for controlling the linear and rotative movements of the head.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. In a machine of the character described, a rotatably mounted head having an aperture through which a work piece may extend, means upon opposite sides of the head for supporting a work piece extending through the head and coaxial therewith, a tool spindle mounted in the head outwardly of said aperture, means for rotating said head, means for driving said spindle during rotation of the head, and means for automatically feeding said spindle toward the axis of the head during rotation of the head.

2. In a machine of the character described, a rotatably mounted head having an aperture through which a work piece may extend, means upon opposite sides of the head for supporting a work piece extending through the head and coaxial therewith, a tool spindle mounted in the head outwardly of said aperture, means for rotating said head, an electric motor carried by said head and having a driving connection with said spindle, and means for supplying current to said motor during rotation of the head.

3. In a machine of the character described, a rotatably mounted head having an aperture through which a work piece may extend, means upon opposite sides of the head for supporting a work piece extending through the head and coaxial therewith, a plurality of tool spindles parallel with the axis of the head and mounted in the head outwardly of said aperture, means for rotating said head, and independent means for driving said spindles during rotation of the head.

4. In a machine of the character described, a rotatably mounted head having an aperture through which a work piece may extend, means upon opposite sides of the head for supporting a work piece extending through the head and coaxial therewith, a plurality of tool spindles parallel with the axis of the head and mounted in the head outwardly of said aperture, means for rotating said head, an electric motor carried by said head, means for supplying current to said motor during rotation of the head, and means for driving said spindles from said motor.

5. In a machine of the character described, a rotatably mounted head having an aperture through which a work piece may extend, means upon opposite sides of the head for supporting a work piece extending through the head and coaxial therewith, a plurality of tool spindles parallel with the axis of the head and mounted in the head outwardly of said aperture, means for rotating said head, an electric motor mounted within said head and having a shaft extending through the head with its opposite ends projecting from opposite sides thereof, and means for driving certain of said spindles from one end of said shaft and other of said spindles from the opposite end of said shaft.

6. In a machine of the character described, a rotatably mounted head having an aperture through which a work piece may extend, means upon opposite sides of the head for supporting a work piece extending through the head and coaxial therewith, a plurality of tool spindles parallel with the axis of the head and mounted in the head outwardly of said aperture, means for rotating said head, means for continuously reciprocating said head, means for varying the speed of the head rotating and reciprocating means, means for varying the length of the reciprocating stroke of the head, and means independently of the means for rotating the head carried by said head for driving said spindles.

7. In a machine of the character described, a supporting frame, a bearing member mounted on the frame, a head rotatably mounted in said bearing member, said bearing member having a slot in the top thereof and said head having a slot adapted to register with the slot of the bearing member whereby a work piece may be lowered into the head, means carried by the frame on opposite sides of the bearing member and head for supporting a work piece extending axially through the head, a tool spindle eccentrically mounted on the head, means for rotating said head in said bearing member, and means for driving said spindle.

8. In a machine of the character described, a supporting frame, a bearing member mounted on the frame, a head rotatably mounted in said bearing member, said bearing member having a slot in the top thereof and said head having a slot adapted to register with the slot of the bearing member whereby a work piece may be lowered into the head, means carried by the frame on opposite sides of the bearing member and head for supporting a work piece extending axially through the head, a tool spindle eccentrically mounted on the head, means for continuously reciprocating said bearing member and head, means for continuously rotating the head in the bearing member, and means mounted on the head for driving said spindle.

9. In a machine of the character described, a supporting frame, a bearing member mounted on the frame, a head rotatably mounted in said bearing member, said bearing member having a slot in the top thereof and said head having a slot adapted to register with the slot of the bearing member whereby a work piece may be lowered into the head, longitudinally adjustable centers mounted on the frame on opposite sides of the head and in axial alinement therewith for engaging the ends of a work piece extending through the head, a tool spindle eccentrically mounted in the head, means for rotating said head in said bearing member, and means mounted on the head for driving said spindle.

10. In a machine of the character described, a supporting frame having spaced standards and a horizontal bed between the standards, a slide mounted on the bed for longitudinal movement between the standards, an upright bearing member carried by the slide having a cylindrical horizontally disposed bore, a cylindrical head rotatably mounted in said bore, said bearing member having an opening across the top thereof and said head having an opening adapted to register with the opening of the bearing member, whereby a work piece may be lowered through the bearing member into the head, centers mounted in said standards and axially alined with said head, means for adjusting said centers axially of the head to clamp a work piece extending through the head, a tool spindle eccentrically mounted in the head, means for reciprocating said slide, means for rotating said head in the bearing member and means for driving said spindle.

11. In a machine of the character described, a rotatably mounted head having an aperture through which a work piece may extend, means for supporting a work piece coaxially with respect to the head, a tool spindle mounted eccentrically on the head, a fluid pressure motor geared to said head to rotate the same, a power driven pump for delivering fluid under pressure to said motor, a fluid pressure cylinder operatively connected to said head for reciprocating the same, a power driven pump for supplying fluid under pressure to said cylinder, means for controlling said pumps to vary the speed of rotation and the speed of linear movement of said head, and means for driving said spindle.

12. A machine for grinding locomotive axles comprising a supporting frame having spaced standards and a horizontal bed between the standards, a slide mounted on said bed, an upright bearing member having a large horizontal bore carried by the slide, a head rotatably mounted in the bore of the bearing member and having an opening extending axially therethrough, centers carried by the standards in axial alinement with the head for supporting an axle coaxially with respect to the head, spindles journaled in the head outwardly of the axial opening of the head, grinding wheels carried by said spindles on opposite sides of the head, means for reciprocating said slide, means for rotating said head, and means for driving said spindles.

13. A machine for grinding locomotive axles comprising a supporting frame having spaced standards and a horizontal bed between the standards, a slide mounted on said bed, an upright bearing member having a large horizontal bore carried by the slide, a head rotatably mounted in the bore of the bearing member and having an opening extending axially therethrough, centers carried by the standards in axial alinement with the head for supporting an axle coaxially with respect to the head, spindles journaled in the head outwardly of the axial opening of the head, grinding wheels carried by said spindles on opposite sides of the head, means for reciprocating said slide, means for rotating said head, means controlled by the rotation of the head for feeding said spindles toward the axis of the head, and means for driving said spindles.

14. A machine for grinding locomotive axles comprising a supporting frame having spaced standards and a horizontal bed between the standards, a slide mounted on said bed, an upright bearing member having a large horizontal bore carried by the slide, a head rotatably mounted in the bore of the bearing member and having an opening extending axially therethrough, centers carried by the standards in axial alinement with the head for supporting an axle coaxially with respect to the head, spindles journaled in the head outwardly of the axial opening of the head, grinding wheels carried by said spindles on opposite sides of the head, means for reciprocating said slide, means for rotating said head, means for controlling the speed of rotation of the head, means for controlling the speed of linear movement of the slide, and means mounted on the head for driving the spindles.

15. A machine for grinding locomotive axles comprising a supporting frame having spaced standards and a horizontal bed between the standards, a slide mounted on said bed, an upright bearing member having a large horizontal bore carried by the slide, a head rotatably mounted in the bore of the bearing member and having an opening extending axially therethrough, centers carried by the standards in axial alinement with the head for supporting an axle coaxially with respect to the head, spindles journaled in the head outwardly of the axial opening of the head, grinding wheels carried by said spindles on opposite sides of the head, means for reciprocating said slide, means for rotating said head, means operated by the head in its rotation for simultaneously feeding the spindles toward the axis of the head, and means independent of the head rotating means for driving said spindles.

16. A machine for grinding locomotive axles comprising a supporting frame, having spaced standards and a horizontal bed between the standards, a slide mounted on said bed, an upright bearing member having a large horizontal bore carried by the slide, a head rotatably mounted in the bore of the bearing member and having an opening extending axially therethrough, centers carried by the standards in axial alinement with the head for supporting an axle coaxially with respect to the head, a pair of spindles mounted in the head, each spindle projecting from opposite sides of the head, and each spindle having a grinding wheel on one end and a pulley on the opposite end, the pulley and grinding wheel of one spindle being on the ends of the spindle opposite that of the pulley and grinding wheel of the other spindle, an electric motor mounted within the head and having a shaft projecting on opposite sides of the head, pulleys on the ends of said shaft, drive belts on opposite sides of the heads connecting the motor shaft and spindles, means for rotating said head, means for reciprocating said slide, and means for supplying electric current to said electric motor during the rotation and reciprocation of the head.

17. A machine for grinding locomotive axles comprising a supporting frame having spaced standards and a horizontal bed between the standards, a slide mounted on said bed, an upright bearing member having a large horizontal bore carried by the slide, a head rotatably mounted in the bore of the bearing member and having an opening extending axially therethrough, centers carried by the standards in axial alinement with the head for supporting an axle coaxially with respect to the head, a pair of spindles mounted in the head, each spindle projecting from opposite sides of the head, and each spindle having a grinding wheel on one end and a pulley on the opposite end, the pulley and grinding wheel of one spindle being on the ends of the spindle opposite that of the pulley and grinding wheel of the other spindle, an electric motor mounted within the head and having a shaft projecting on opposite sides of the head, pulleys on the ends of said shaft, drive belts on opposite sides of the heads connecting the motor shaft and spindles, means for rotating said head, means for reciprocating said slide, means for varying the length of the stroke of the slide, and means for supplying electric current to said electric motor during the rotation and reciprocation of the head.

18. In a machine for grinding external bearing surfaces on locomotive axles inwardly of the wheels thereon, comprising a frame having spaced standards and a horizontal bed between the standards, axially alined adjustable centers on said standards engageable with the ends of an axle, means on the frame engageable with a wheel to hold the wheel and axle assembly against rotation, a longitudinally movable slide on said bed, an upright bearing member carried by the slide and having a large horizontal bore through which an axle supported on said centers extends, said bearing member having a slot at the top thereof through which an axle may be lowered, a head rotatably mounted in the bore of the bearing member and having a radial slot adapted to register with the slot of the bearing member to permit an axle to be positioned coaxially with respect to the head, grinding wheels carried by said head and engageable with the surface of the axle on opposite sides of the head, means for rotating said head, means for reciprocating said slide, and means for driving said grinding wheels.

19. In a machine for grinding external bearing surfaces on locomotive axles inwardly of the wheels thereon, comprising a frame having spaced standards and a horizontal bed between the standards, axially alined adjustable centers on said standards engageable with the ends of an axle, means on the frame engageable with a wheel to hold the wheel and axle assembly against rotation, a longitudinally movable slide on said bed, an upright bearing member carried by the slide and having a large horizontal bore through which an axle supported on said centers extends, said bearing member having a slot at the top thereof through which an axle may be lowered, a head rotatably mounted in the bore of the bearing member and having a radial slot adapted to register with the slot of the bearing member to permit an axle to be positioned coaxially with respect to the head, grinding wheels carried by said head and engageable with the surface of the axle on opposite sides of the head, means for rotating said head, means for reciprocating said slide, means for varying the length of the stroke of the slide, and means for driving said grinding wheel.

20. In a machine for grinding external bearing surfaces on locomotive axles inwardly of the wheels thereon, comprising a frame having spaced standards, and a horizontal bed between the standards, axially alined adjustable centers on said standards engageable with the ends of an axle, means on the frame engageable with a wheel to hold the wheel an axle assembly against rotation, a longitudinally movable slide on said bed, an upright bearing member carried by the slide and having a large horizontal bore through which an axle supported on said centers extends, said bearing member having a slot at the top thereof through which an axle may be lowered, a head rotatably mounted in the bore of the bearing member and having a radial slot adapted to register with the slot of the bearing member to permit an axle to be positioned coaxially with respect to the head, grinding wheels carried by said head and engageable with the surface of the axle on opposite sides of the head, means for rotating said head, means for reciprocating said slide, means for varying the speed of rotation of the head and the linear speed of the slide, and means for driving said grinding wheels.

21. In a machine for grinding external bearing surfaces on locomotive axles inwardly of the wheels thereon, comprising means for supporting an axle assembly and for holding the same against rotation, a head having an opening to receive said axle, means for supporting the head coaxially with the axle assembly between the wheels thereof and for rotating said head, grinding wheels carried by the head on opposite sides thereof and engaging the axle, means for reciprocating said head axially, and means for driving said grinding wheels.

22. In a machine for grinding external bearing surfaces on locomotive axles inwardly of the wheels thereon, comprising means for supporting an axle assembly and for holding the same against rotation, a head having an opening to receive said axle, means for supporting the head coaxially with the axle assembly between the wheels thereof and for rotating said head, grinding wheels carried by the head on opposite sides thereof and engaging the axle, means for reciprocating said head axially, means for varying the length of the stroke of said head, and means for driving said grinding wheels.

23. In a machine for grinding external bearing surfaces on locomotive axles inwardly of the wheels thereon, comprising means for supporting an axle assembly and for holding the same against rotation, a head having an opening to receive said axle, means for supporting the head coaxially with the axle assembly betweeen the wheels thereof and for rotating said head, grinding wheels carried by the head on opposite sides thereof and engaging the axle, means for reciprocating said head axially, an electric motor carried by the head operatively connected to said grinding wheel for driving the same, and means for supplying electric current to said motor during movements of the head.

24. In a machine for grinding external bearing surfaces on locomotive axles inwardly of the wheels thereon, comprising means for supporting an axle assembly and for holding the same against rotation, a head having an opening to receive said axle, means for supporting the head coaxially with the axle assembly between the wheels thereof and for rotating said head, grinding wheels carried by the head on opposite sides thereof and engaging the axle, means for reciprocating said head axially, means for driving said grinding wheels, and means for automatically feeding the grinding wheels toward the work during rotation of the head.

25. In a machine for grinding external bearing surfaces on locomotive axles inwardly of the wheels thereon, comprising means for supporting an axle assembly and for holding the same against rotation, a head having an opening to receive said axle, means for supporting the head coaxially with the axle assembly between the wheels thereof, and for rotating said head, grinding wheels carried by the head on opposite sides thereof and engaging the axle, means for reciprocating said head axially, means for varying the speed of rotation of the head and for varying the speed of linear movement thereof, means for varying the length of the stroke of the head, and means for driving said grinding wheels.

26. In a machine of the character described, a rotatably mounted head having an aperture through which a work piece may extend, means for supporting a work piece extending through the head and coaxial therewith, a plurality of rotatable longitudinally spaced work engaging tools carried by the head, means for rotating said head, means for driving said tools and independent means controlled by the rotation of said head for feeding each of the tools relative to said head toward the work piece.

27. In a machine of the character described, a rotatably mounted head having an aperture through which a work piece may extend, means for supporting a work piece extending through the head and coaxial therewith, a plurality of rotatable longitudinally spaced work engaging tools carried by the head, means for rotating said head, means independently of said last mentioned means for rotating said tools, and independent means controlled by the rotation of said head for automatically feeding each tool toward the work piece during operation of the machine.

28. In a machine for grinding spaced external surfaces on a relatively large work piece, a bed member having an annular bearing member thereon, a head rotatably mounted in said bearing member and having an axial opening therein for receiving the work piece, means for holding the work piece against movement and for holding it coaxially with said head, rotatable grinding wheels carried by the head on opposite sides thereof for simultaneously grinding the spaced external surfaces of the work piece, means for rotating said head, means for rotating said grinding wheels, and means for axially reciprocating said bearing member during rotation of said head and grinding wheels.

29. In a machine for grinding spaced external surfaces on a relatively large work piece, a bed member having an annular bearing member thereon, a head rotatably mounted in said bearing member and having an axial opening therein for receiving the work piece, means for holding the work piece against movement and for holding it coaxially with said head, rotatable grinding wheels carried by the head on opposite sides thereof for simultaneously grinding the spaced external surfaces of the work piece, means for rotating said head, means for rotating said grinding wheels, means for automatically feeding said grinding wheels toward the axis of said head during rotation thereof, and means for axially reciprocating said bearing member during rotation of said head and grinding wheels.

30. In a machine of the character described, a bed member, spaced vertical standards on said bed member, an annular bearing member on said bed member between said standards, a head rotatably mounted in said bearing member, said head having a central opening for receiving a work piece, means on said standards for supporting the work piece in axial alignment with said head and for holding the work piece against movement, a rotatable grinding wheel spindle having a cutting tool thereon mounted in said head parallel to the axis thereof, means for rotating said head, and means for rotating said grinding wheel spindle.

31. In a machine of the character described, a bed member, spaced vertical standards on said bed member, an annular bearing member on said bed member between said standards, a head rotatably mounted in said bearing member, said head having a central opening for receiving a work piece, means on said standards for supporting the work piece in axial alignment with said head and for holding the work piece against movement, a rotatable grinding wheel spindle having a cutting tool thereon mounted in said head parallel to the axis thereof, means for rotating said head, means for rotating said grinding wheel spindle, and means for reciprocating said bearing member relative to the work piece during rotation of said head and spindle.

32. In a machine for grinding the journal bearings of locomotive axles, comprising a bed, an annular bearing member mounted on said bed for axial reciprocation, a head rotatably mounted in said bearing member and having a central opening therein for the reception of a locomotive axle, means for supporting the axle in axial alignment with said head and with the journal bearings disposed at opposite sides of said head, a pair of rotatable grinding wheels each mounted eccentrically on the opposite sides of said head in parallel relationship with the axis thereof, means for rotating and for reciprocating said head, means for varying the speed of rotation and the speed of reciprocation of said head, and means for rotating said grinding wheels during rotation and reciprocation of said head.

33. In a machine for grinding the journal bearings of locomotive axles, comprising a bed, an annular bearing member mounted on said bed for axial reciprocation, a head rotatably mounted in said bearing member and having a central opening therein for the reception of a locomotive axle, means for supporting the axle in axial alignment with said head and with the journal bearings disposed at opposite sides of said head, a pair of rotatable grinding wheels each mounted eccentrically on the opposite sides of said head in parallel relationship with the axis thereof, means for rotating and for reciprocating said head, means for varying the speed of rotation and the speed of reciprocation of said head, and means independent of said head rotating and reciprocating means for rotating said grinding wheels during rotation and reciprocation of said head.

In testimony whereof we affix our signatures.

HENRY H. YERK.
WILLIAM J. BAUMBERGER.